United States Patent [19]

May

[11] Patent Number: 5,973,688
[45] Date of Patent: Oct. 26, 1999

[54] COMPUTING SYSTEM HAVING DELAYED KEYBOARD SHORTCUT HINTS

[76] Inventor: Gregory J May, 4115 NE. Morning St., Corvallis, Oreg. 97330

[21] Appl. No.: 08/961,604

[22] Filed: Oct. 31, 1997

[51] Int. Cl.$^6$ ................................. G06F 3/14; G06F 3/02
[52] U.S. Cl. ........................ 345/338; 345/347; 345/352; 345/145; 345/172
[58] Field of Search ..................................... 345/336, 337, 345/338, 339, 347, 352, 353, 145, 168, 172

[56] References Cited

U.S. PATENT DOCUMENTS

| | | | |
|---|---|---|---|
| 4,992,972 | 2/1991 | Brooks et al. | 345/353 |
| 5,155,806 | 10/1992 | Hoeber et al. | 345/338 |
| 5,258,748 | 11/1993 | Jones | 345/172 |
| 5,287,448 | 2/1994 | Nicol et al. | 345/347 |
| 5,287,514 | 2/1994 | Gram | 345/333 |
| 5,525,978 | 6/1996 | York et al. | 345/349 |

OTHER PUBLICATIONS

Alan Simpson, Mastering Wordperfect 6 For Widows, SYBEX Inc., pp. 1 to 48, 590 to 595, 1994.
Dickinson, John, The Business of Words: Professional, PC Magazine, v5,n2,pp. 135–136 Jan. 1986.

Primary Examiner—Raymond J. Bayerl
Assistant Examiner—Thomas T. Nguyen

[57] ABSTRACT

Information about shortcuts available from a keyboard is provided to a user of a computing system. When a user selects a special key sequence and the special key sequence remains selected for a predetermined length of time, information on shortcuts available for key combinations which include the special key sequence is displayed. While the special key sequence remains selected for the predetermined length of time and the user presses an additional key, forming a new key combination, a help note for the new key combination is displayed. When the user places a cursor over a button for a history stack, the history stack is displayed. When the user places the cursor over an entry within the history stack or over an entry within the information originally displayed on shortcuts, a help note for the entry is displayed. Thus an entry for a particular function can simultaneously be displayed in a help note, a history stack and/or within the information on shortcuts originally displayed. The function is executed when a cursor is placed over any entry for the function and the user clicks a button on a pointing device.

31 Claims, 10 Drawing Sheets

COMPUTING SYSTEM HAVING DELAYED KEYBOARD SHORTCUT HINTS

BACKGROUND

The present invention concerns computing systems and pertains particularly to providing information to a user about shortcuts available from the keyboard.

Keyboards for computing systems generally have special keys such as a control (Ctrl) key and an alternate (Alt) key. Applications which run on the computing system often allow a user to initiate special functions when the user presses the special keys in combination with certain other keys on the keyboard for the computing system. For example, many word processors initiate a "Copy" function when the user presses and holds the Ctrl key and then presses the letter "c" on the keyboard. Selecting other combinations of special keys and other keys can also be used to, for example, start macros, provide for a shortcut to type often used phrases and so on.

For common graphics user interfaces (GUI), commands are designed to be primarily selected by a user using a point selection device. For this reason there is often extensive help built into the GUI to provide help to a user to aid the user in initiating commands using a "point and select" methodology. For example, in many applications which run on the Windows 95 operating system available from Microsoft Corporation, a user can place a cursor over a tool, typically with a mouse, on a tool bar. After the cursor remains over the tool bar for a few seconds, a hint pops up which gives information about the tool. Similar functionality is implemented as "Balloon Help" in the Macintosh operating system available from Apple Corporation. Within operating systems and program applications which utilize GUI interfaces, initiating special functions when the user presses the special keys in combination with certain other keys on the keyboard for the computing system are considered alternate or "shortcut" forms of initiating the functions. Because these are alternate or "shortcut" forms of initiating the functions the various key combinations of special keys and other keys on the keyboard used to invoke functions are often poorly documented. To use special keys to initiate functions generally requires a user to memorize each special key combination. Since most users can only conveniently memorize a limited number of frequently used special key combinations, this has limited the special key combinations users can efficiently use. This requires the user to utilize the more cumbersome "point and select" methodology for most functions.

SUMMARY OF THE INVENTION

In accordance with the preferred embodiment of the present invention, information about shortcuts available from a keyboard is provided to a user of a computing system. When a special key sequence is selected for a predetermined length of time, information on shortcuts available for key combinations which include the special key sequence is displayed.

The special key sequence consists of one or more special keys on the keyboard. For example, the special key sequence is the control key alone, or the alternate key alone. The special key sequence can also be a plurality of keys. For example, the special key sequence includes the control key and the alternate key, the special key sequence includes the control key and the shift key, the special key sequence includes the alternate key and the shift key, or the special key sequence includes the alternate key, the control key and the shift key. In addition, the special key sequence can also include one or more keys on a pointing device such as a mouse.

In the preferred embodiment of the present invention when the special key sequence has been selected for a predetermined length of time and the user additionally pressing an additional key, a help note for the new key combination is displayed. For example, the help note displayed contains information previously entered by a user. Alternatively, the help note displayed contains text directly from another help file already used for other functions, available on the computing system apart from the shortcut functionality and which explains operation of a function which is called by the new key combination.

In the preferred embodiment, the help note is removed upon the user releasing the additional key. If the user then presses a second additional key in addition to the special key sequence remaining selected, the second additional key plus the special key sequence forms a second new key combination, and a help note for the second new key combination is displayed. Likewise, the information on shortcuts is removed from display upon the user releasing the special key sequence.

Additionally, in the preferred embodiment, when the user places a cursor over an entry in the window (for example, using a pointing device such as a mouse) a help note for the entry is displayed. The help note is removed upon the user moving the cursor away from the entry. A function for the entry is performed when the user clicks a button on the pointing device while the cursor remains placed over the entry.

Also, in the preferred embodiment, when the user places a cursor over a button for a history stack, the history stack is displayed. When the user places the cursor over an entry within the history stack, a help note for the entry is displayed. A function for the entry is performed when the user clicks a button on a pointing device while the cursor remains placed over the entry. The help note is removed upon the user moving the cursor away from the entry.

The present invention provides for a simple effective way to inform a user about various shortcuts available from the keyboard without requiring a user to perform the function and/or search a manual or help file.

DESCRIPTION OF THE PREFERRED EMBODIMENT

Figure 1:
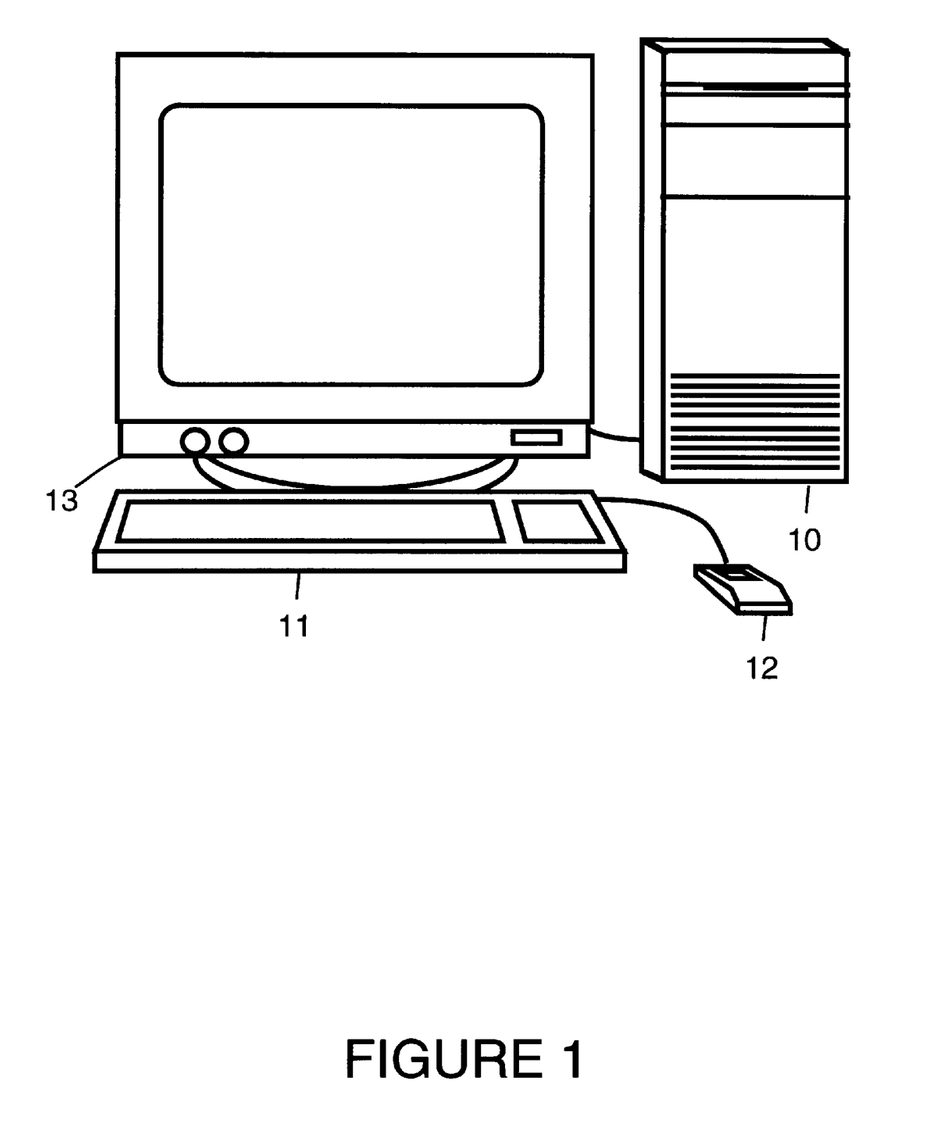
FIG. 1 shows a computing system which includes a processor, monitor, keyboard and mouse.

FIG. 1 shows a computing system which includes a processor 10, a monitor 13, a keyboard 11 and a mouse 12. Other types of pointing and selection devices can be substituted for mouse 12.

In the preferred embodiment of the present invention, when a user presses a special key sequence on keyboard 11 and holds the special key sequence for a predetermined delay (e.g., 1 second), a list of shortcuts accessible using the special key sequence is displayed on the screen of monitor 13. If the keyboard uses "sticky keys", the special key sequence can remain selected even though the user stops holding the keys down.

For example, a first list of shortcuts is displayed if the control (Ctrl) key is pressed. A second list of shortcuts is displayed if the alternate (Alt) key is pressed. A third list of shortcuts is displayed if both the alternate (Alt) key and the control (Ctrl) key is pressed. A fourth list of shortcuts is displayed if both the alternate (Alt) key and the shift (Shift) key is pressed. A fifth list of shortcuts is displayed if both the control (Ctrl) and the shift (Shift) key is pressed.

The special key sequence can also include one or more buttons on mouse 12 or some other pointing device. For example, the first list of shortcuts is displayed if the control (Ctrl) key is pressed along with a first mouse button. The second list of shortcuts is displayed if the alternate (Alt) key is pressed along with the first mouse button. The third list of shortcuts is displayed if both the alternate (Alt) key and the control (Ctrl) key is pressed along with the first mouse button. The fourth list of shortcuts is displayed if both the alternate (Alt) key and the shift (Shift) key is pressed along with the first mouse button. The fifth list of shortcuts is displayed if both the control (Ctrl) and the shift (Shift) key is pressed along with the first mouse button.

Figure 2:
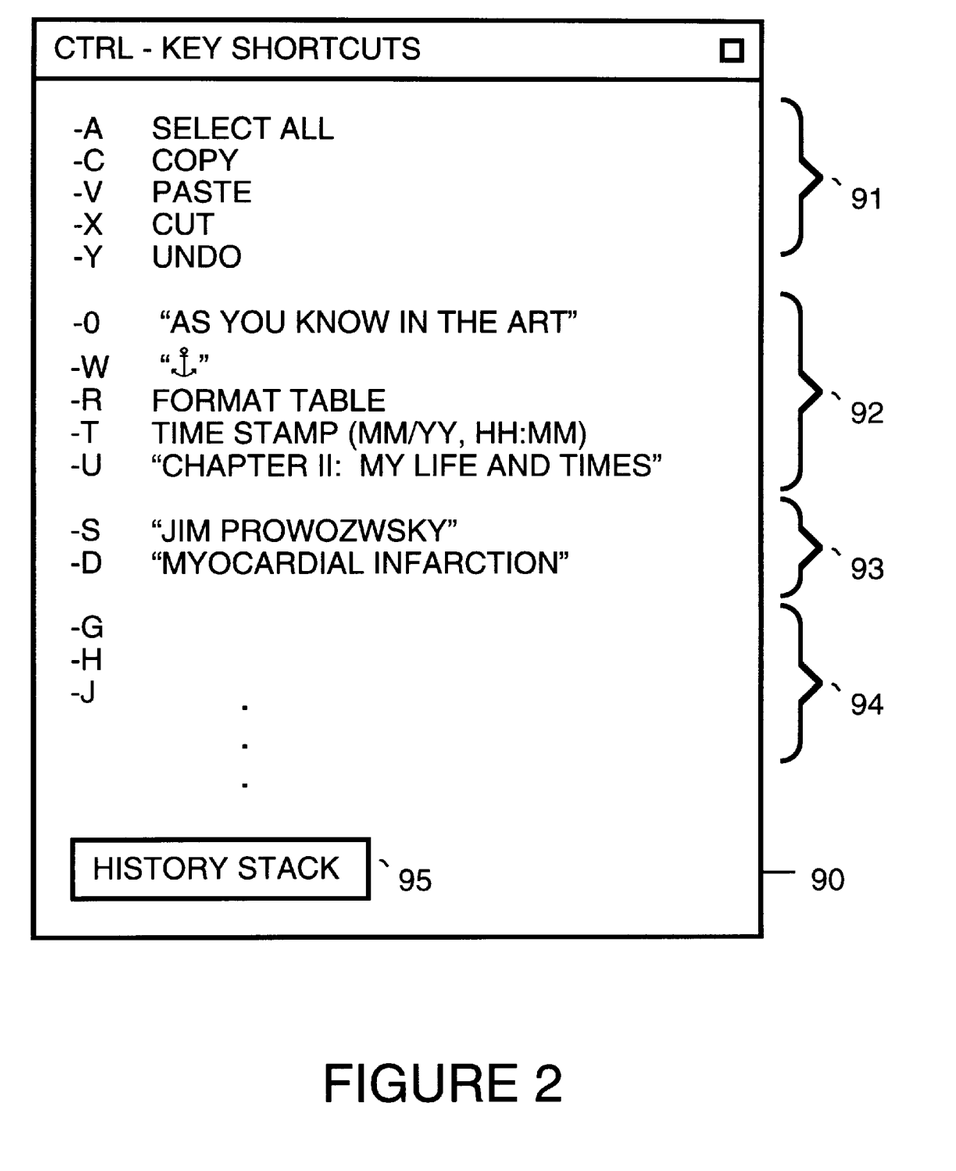
FIG. 2 shows a simplified "key shortcuts" window generated by a shortcut function in accordance with the preferred embodiment of the present invention.

For example, FIG. 2 shows a portion of key shortcuts listed in a window 90 which appears after a user the special key sequence, which consists of the "Ctrl" key, remains selected. In a section 91 of the list of shortcuts, the function "Select All", "Copy", "Paste", "Cut", and "Undo" are listed next to the letter associated with the function. A user reviewing window 90 would be informed, for example, that pressing the combination of keys "Ctrl" "a" would result in the "Select All" function being performed. Pressing the combination of keys "Ctrl" "c" would result in the "Copy" function being performed. Pressing the combination of keys "Ctrl" "v" would result in the "Paste" function being performed. Pressing the combination of keys "Ctrl" "x" would result in the "Cut" function being performed. Pressing the combination of keys "Ctrl" "y" would result in the "Undo" function being performed. And so on.

In a section 92 and a section 93 of window 90, additional shortcuts are listed. Pressing the combination of keys "Ctrl" "o" would result in the text "As you know in the art" being placed in the open file displayed on the screen of monitor 12. Pressing the combination of keys "Ctrl" "w" would result in a graphic representation of an anchor appearing in the open file displayed on the screen of monitor 12. Pressing the combination of keys "Ctrl" "r" would result in the "Format Table" function being performed. Pressing the combination of keys "Ctrl" "t" would result in a time stamp being placed in the open file. Pressing the combination of keys "Ctrl" "u" would result in the text "Chapter II: My Life and Times" being placed in the open file displayed on the screen of monitor 12. Pressing the combination of keys "Ctrl" "s" would result in the text "Jim Prowozwsky" being placed in the open file displayed on the screen of monitor 12. Pressing the combination of keys "Ctrl" "d" would result in the text "Myocardial Infarction" being placed in the open file displayed on the screen of monitor 12.

As shown in section 94 of window 90, there are no shortcuts assigned to the key combinations "Ctrl" "g", "Ctrl" "h" or "Ctrl" "j".

Figure 3:
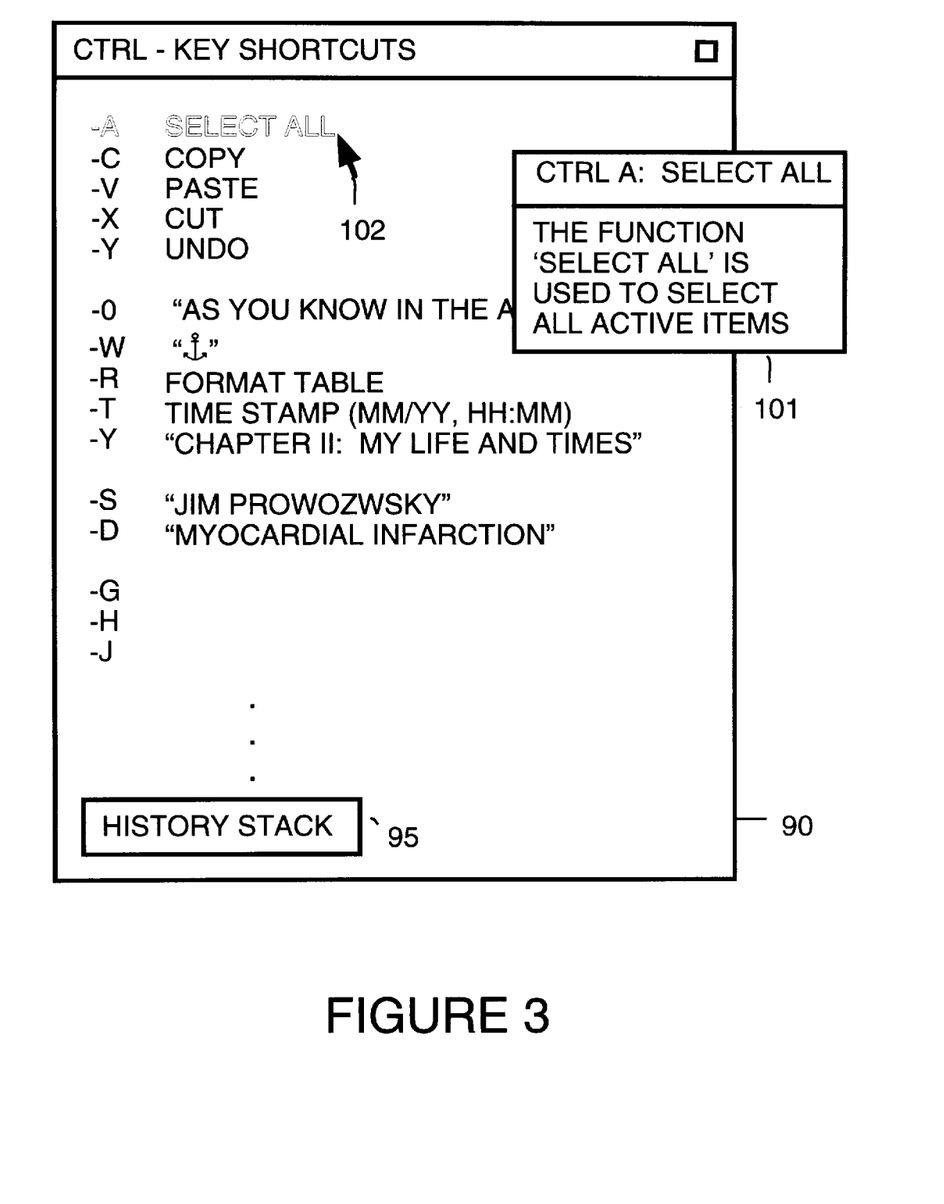
FIG. 3 shows a simplified "help note" window generated by a shortcut function in accordance with the preferred embodiment of the present invention.

If the special key sequence remains selected and in addition the user presses an additional key, and holds the additional key down for a predetermined period of time, any help note for the new total key combination appears. For example, if a user continues to hold the "Ctrl" key and in addition presses the alphanumeric key "a", a help note 101 appears for the function "Select All", as shown in FIG. 3.

In the preferred embodiment of the present invention, help notes may be brought up for any additional key by using mouse 12 or any other pointing device, to place a cursor 102 over the entry in shortcut window 90. This is illustrated in FIG. 3. When the help note is up for an entry in shortcut window 90, the entry is highlighted. This is illustrated in FIG. 3 by the highlighting of the entry for "Select All" in window 90.

If while cursor 102 is over an entry in window 90 and a button on mouse 12 (or another pointing device) is pushed, the function is executed.

Figure 10:
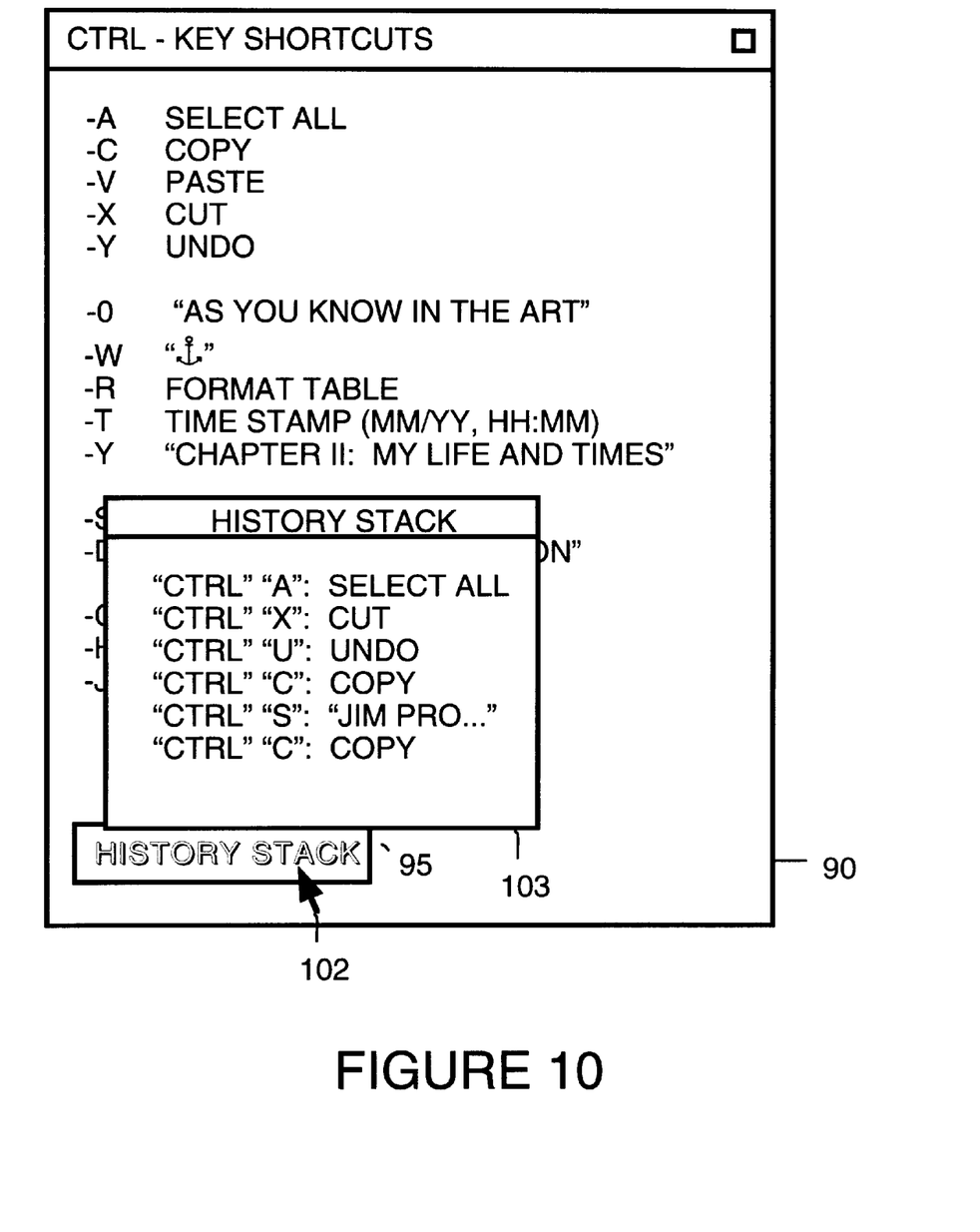
FIG. 10 shows a simplified "history" window generated by a shortcut function in accordance with the preferred embodiment of the present invention.

Additionally, as shown in FIG. 10, placing cursor 102 over history stack button 95 results in a history stack window 103 being displayed. The user can then use mouse 12 or another pointing device to place cursor 102 over any entry in history stack 103 to highlight the entry. A help note will appear for the entry. If while cursor 102 is over an entry in history window 103 and a button on mouse 12 (or another pointing device) is pushed, the function is executed. When cursor 102 moves off of history window 103 and history stack button 103, history window 103 is closed. Alternatively, if the user clicks on history stack 95, history window 103 stays up.

Figure 4:
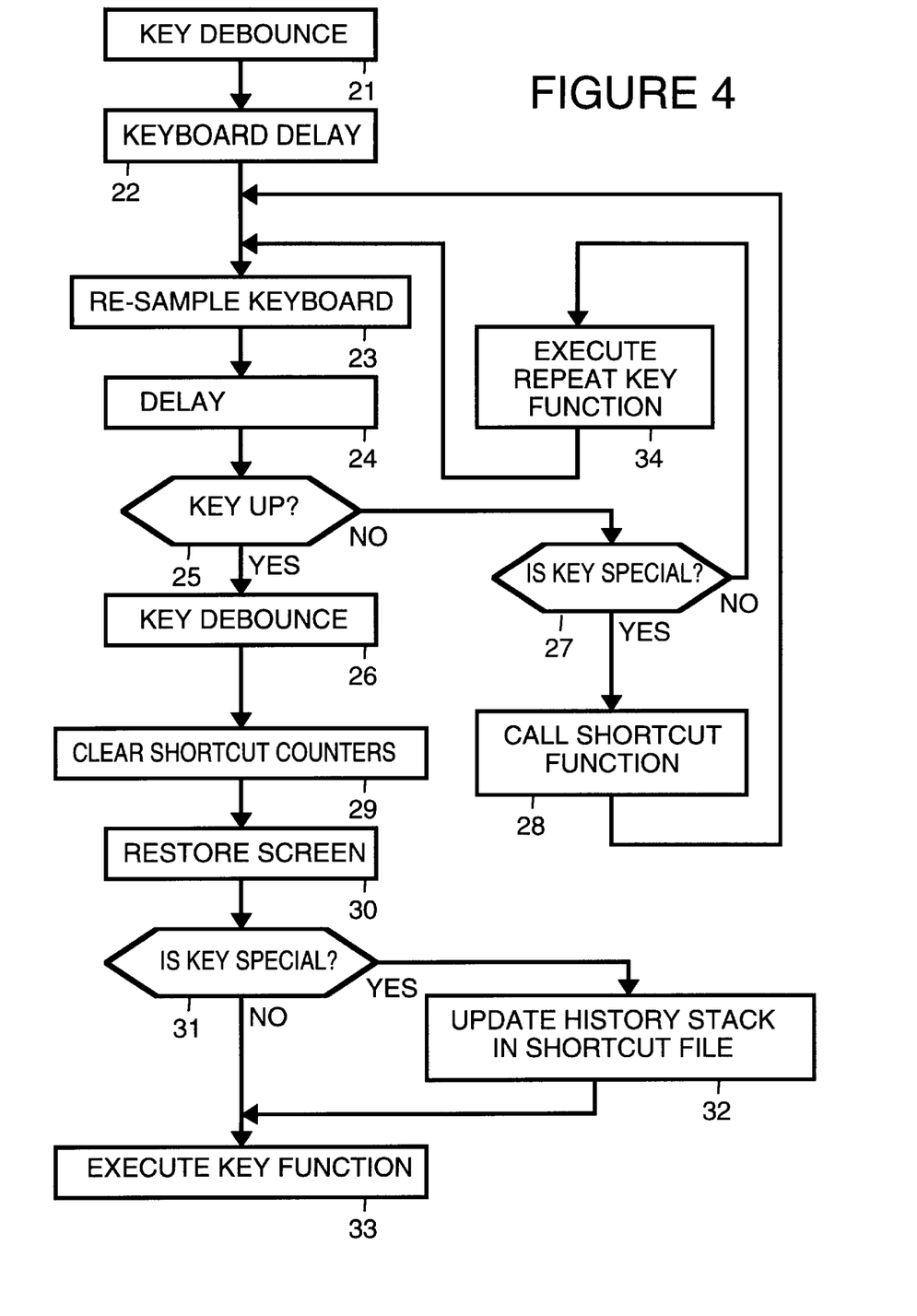
FIG. 4 is a flowchart which illustrates calling of a shortcut function when a special key sequence is held down for a predetermined time duration in accordance with the preferred embodiment of the present invention.

FIG. 4 is a simplified flowchart which illustrates calling of a shortcut function when a special key sequence is held down for a predetermined time duration in accordance with the preferred embodiment of the present invention. The special key sequence is, for example, a special key such as a control (Ctrl) key or an alternate (Alt) key. The special key sequence can be also be a plurality of keys. For example, the special key sequence includes the control key and the alternate (Alt) key, the special key sequence includes control (Ctrl) key and the shift key, the special key sequence includes the alternate (Alt) key and the shift key, or the special key sequence includes the (Alt) alternate key, the control (Ctrl) key and the shift key.

The shortcut function can be implemented as a software routine executed completely within processor 10, or can be partially or fully implemented in firmware and/or software within keyboard 11.

In a step 21, after the pressing of a key sequence, the key or keys is/are debounced. In a step 22, the process waits for a predetermined keyboard delay. In a step 23, after the initial keyboard delay in step 22, the key sequence is resampled. In a step 24, an additional delay is instituted. In a step 25, a check is made to see if the previously pressed key sequence has been released. In addition to keys pressed on the keyboard, step 25 can also check for a pressed mouse button. If the delay in step 24 has completely past and in step 25, the key sequence is still not released, in a step 27 a check is made to see if the key sequence is a special key sequence. If more than one key is pressed, in step 27 a check is made to see if one of the pressed keys or any combination of the pressed keys are a special key sequence. In addition to keys pressed on the keyboard, step 27 can also check for a pressed mouse button as a special key sequence or in combination with one or more special keys on keyboard 11 to form a special key sequence.

If there is a special key sequence, in a step 28, a shortcut function is called. If in step 27, there is no special key sequence pressed, in step 34, a repeat key function is executed which repeats the function of the pressed key.

If in step 25 it is detected that during delay 24, the key or keys was/were released, in a step 26 the key/keys is/are debounced. In a step 29, shortcut counters are cleared. In a step 30, any shortcut windows or help note windows currently up are removed from the screen of monitor 13. In a step 31, a check was made to see if the key sequence was special. If so, in a step 32 a history stack in the shortcut file is updated. In a step 33, any key function for the pressed and released key sequence is executed.

Figure 5:
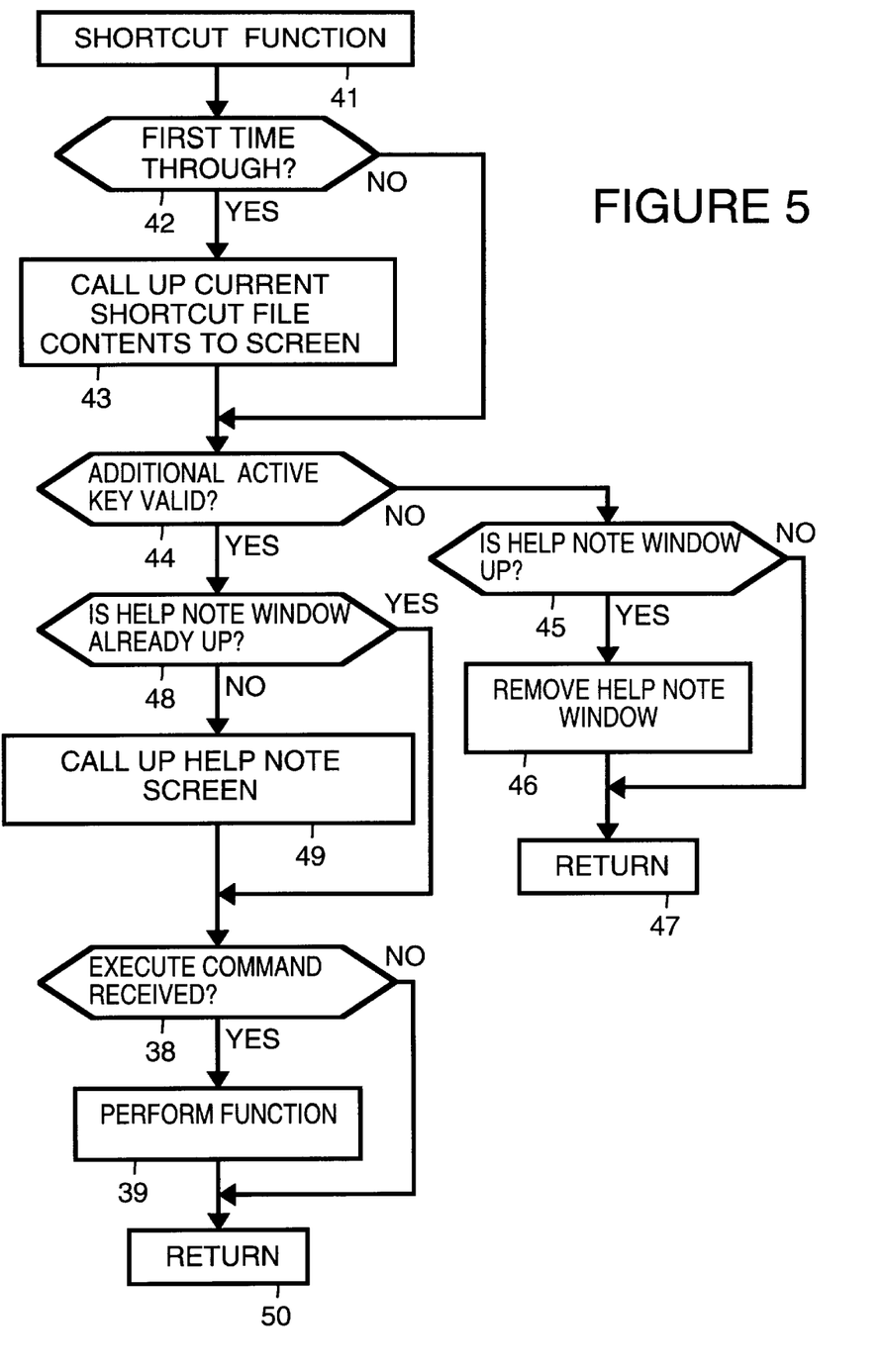
FIG. 5 is a flowchart which illustrates operation of a shortcut function in accordance with the preferred embodiment of the present invention.

FIG. 5 is a flowchart which illustrates operation of a shortcut function in accordance with the preferred embodiment of the present invention. In a step 41 the shortcut function begins. In a step 42 a check is made to see whether this is the first time through the function for any pressed special key sequence for this key(s) down. If so, in a step 43, a current shortcut window is displayed for the special key sequence pressed. If the user selects history stack button 95 (FIG. 10) history window 103 is displayed along with the current shortcut window.

In a step 44, a check is made to see if there is an active key valid in addition to the special key sequence. In step 44, there is also a check to see if a cursor is over any entry in the shortcut window. Active key takes precedence over location of cursor. If in step 44 there is not an active key valid (or no entry in the shortcut window selected by mouse 12), in a step 45 a check is made to see if there is a help note window up. If so, in a step 46, the help note window is removed. In a step 47 the shortcut function returns.

If in step 44 there is an active key valid (or an entry in the shortcut window selected by mouse 12), in a step 48 a check is made to see whether there is a help note window already displayed for the active key (or entry in the shortcut window) selected. If not, in a step 49, a help note window for the active key is called up. In a step 38, a check is made to see if an execute command has been received. In the preferred embodiment, an execute command is received, for example, if cursor 102 is over an entry in a shortcut window or history window and a button on pointing device 12 is pressed. If so, in a step 39, the function corresponding to the entry cursor 102 is over is performed. In a step 50 the shortcut function returns.

Figure 6:
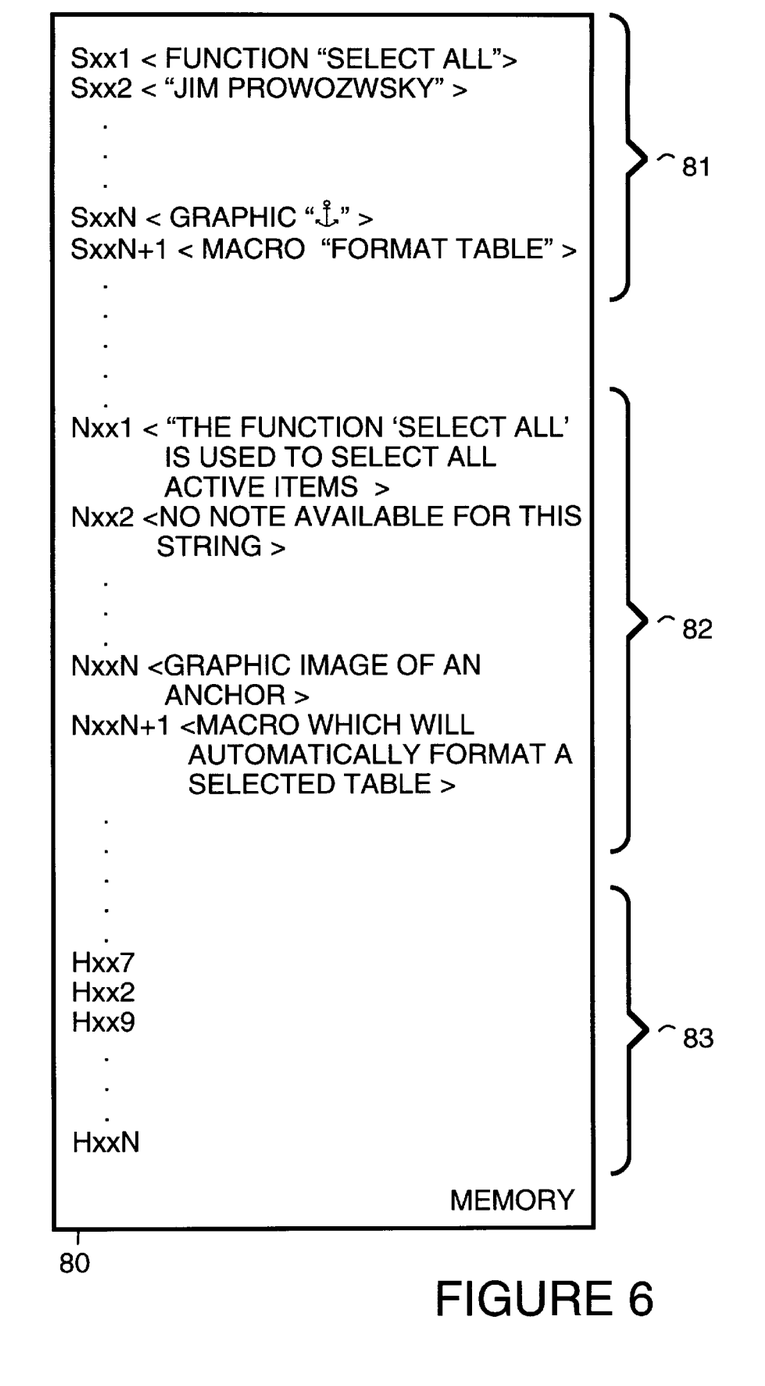
FIG. 6 is a simplified block diagram of a portion of memory in which is stored information used by a shortcut function in accordance with the preferred embodiment of the present invention.

FIG. 6 is a simplified block diagram of a portion of a memory 80 in which is stored information used by the shortcut function in accordance with the preferred embodiment of the present invention. In a section 81, the shortcut function is stored. Depending upon organization, section 81 can be an individual file or a section of a file. In section 81 each entry has a key identification number and a shortcut list. For example, the first entry shown has the identification number "Sxx1". The "S" is a flag. "xx1" indicates which special key sequence is pressed (e.g., the Alt key, the Ctrl, or some combination of the Alt key, the Ctrl key and the Shift key) and identifies a non-special key which when pressed with the special key sequence performs the listed shortcut function. For example, in the example shown in FIG. 6, "Sxx1" identifies the special key Ctrl plus the alpha-numeric key "a". As represented by the first entry, pressing the key combination "Ctrl"-"a" results in the function "select all" being performed.

Similarly, the second entry shown has the identification number "Sxx2". The "Sxx2" identifies the special key Ctrl plus the alpha-numeric key "s". As represented by the first entry, pressing the key combination "Ctrl"-"s" results in the letters "Jim Prowozwsky" being typed on the screen of monitor 13.

In a section 82, the help note information is stored for each short-cut. Depending upon organization, section 82 can be an individual file or a section of a file. In section 82 each entry has a key identification number and a help note. For example, the first entry shown has the identification number "Nxx1". The "N" indicates that this is a help note for a special key sequence (e.g., the Alt key, the Ctrl, or some combination of the Alt key, the Ctrl key and the Shift key.). The "xx1" identifies the special key sequence plus the non-special key. For example, in the example shown in FIG. 6, "Nxx1" identifies a help note for the combination of the special key "Ctrl" the alpha-numeric key "a". As represented by the first entry, the help note for the key combination "Ctrl"-"a" states: "The function 'Select All' is used to select all active items.

In a section 83 of memory 80 is a history stack for special key sequences which where pressed. The "H" at the beginning of each entry indicates that this is a history stack entry.

Figure 7:
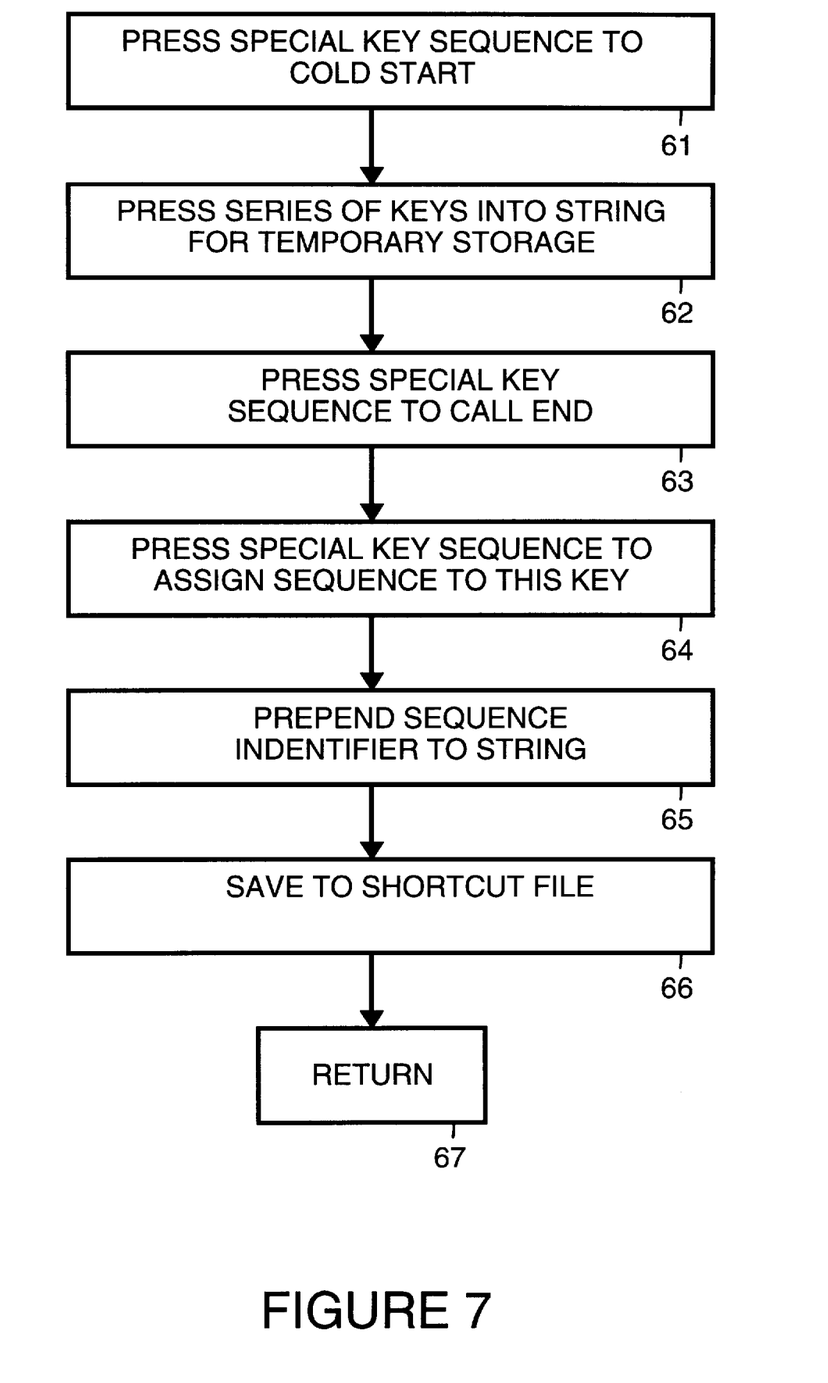
FIG. 7 is a flowchart which illustrates adding information to a short cut file used by a shortcut function in accordance with the preferred embodiment of the present invention.

FIG. 7 is a flowchart which illustrates adding information to section 81 of memory 80. In a step 61, a special key sequence is pressed to cold start the assignment process. For example, the key combination "Ctrl" "Alt" "<" is used.

In a step 62, in response to the user pressing a series of keys, the series of keys are temporarily stored in a string. In a step 63, upon a user pressing a special key sequence, the string is ended. For example, the key combination "Ctrl" "Alt" ">" is used to end the string.

In a step 64, the user presses a special key sequence to assigned to the key string the special key sequence (e.g., "Ctrl" "a"). In a step 65, the special key sequence is prepended to the string. In a step 66, the string with the prepended special key sequence is saved to section 81 of memory 80. In a step 67, the assignment process is complete.

Figure 8:
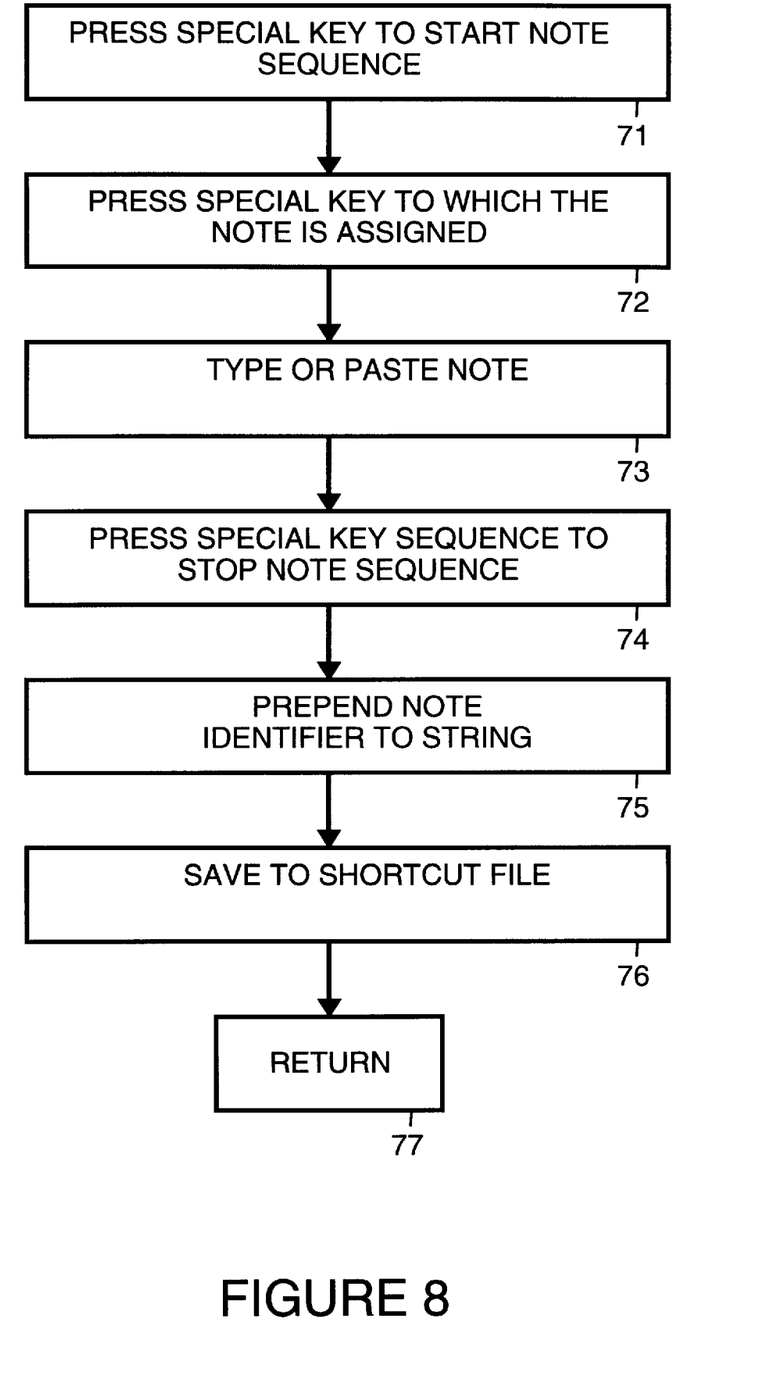
FIG. 8 is a flowchart which illustrates adding information to a help note file used by a shortcut function in accordance with the preferred embodiment of the present invention.

FIG. 8 is a flowchart which illustrates adding information to section 82 of memory 80. In a step 71, a special key sequence is pressed to start the note assignment process. For example, the key combination "Ctrl" "Alt" "n" is used.

In a step 72, the user presses a special key sequence to which the help note will be assigned (e.g., "Ctrl" "a"). In a step 73, the user types or pastes the help note. In a step 74, upon a user pressing a special key sequence, the string is ended. For example, the key combination "Ctrl" "Alt" "n" is used.

In a step 75, the special key sequence is prepended to the help note. In a step 76, the string with the prepended special key sequence is saved to section 82 of memory 80. In a step 77, the assignment process is complete.

In addition to a user placing all help notes into section 82 of memory 80, in an alternative embodiment of the present invention, some help notes are implemented by a pointer to an entry in a separate help file. For example, the text in the help file pointed to exists independent to the shortcut functionality. That is, the text in the help file may be part of a help system already in existence in the computing system which provides general help information to the user of the computing system or which provides help information to the user of a particular application running on the computing system.

Figure 9:
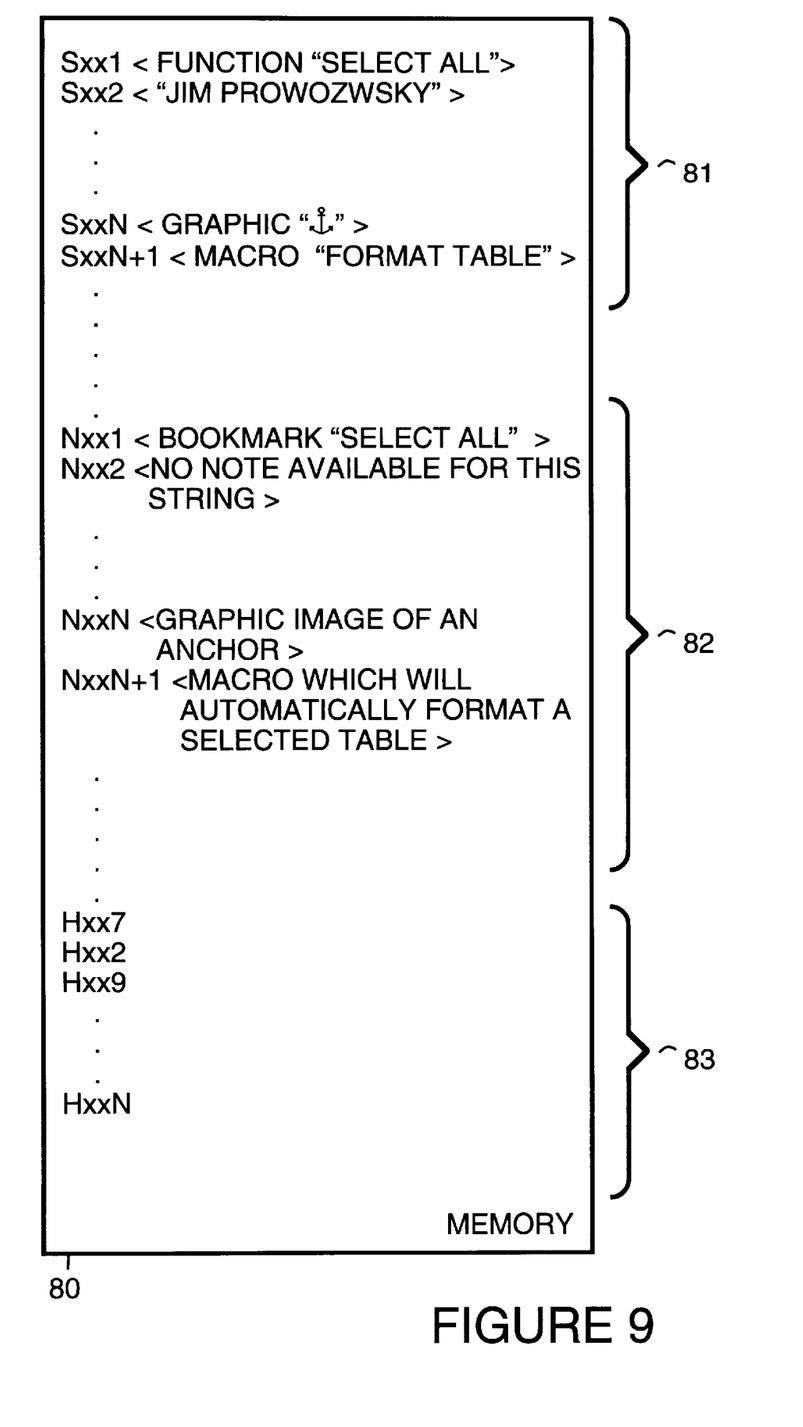
FIG. 9 is a simplified block diagram of a portion of memory in which is stored information used by a shortcut function in accordance with an alternate preferred embodiment of the present invention.

For example, FIG. 9 is another simplified block diagram of the portion of memory 80 also shown in FIG. 6. In section 82 each entry has a key identification number and either a help note or a pointer to a section in a help text file. For example, the first entry shown has the identification number "Nxx1". The "N" indicates that this is a help note for a special key sequence (e.g., the Alt key, the Ctrl, or some combination of the Alt key, the Ctrl key and the Shift key.). The "xx1" identifies the special key sequence and a non-special key. For example, in the example shown in FIG. 9, "Nxx1" identifies a help note for the combination of the special key "Ctrl" the alpha-numeric key "a". As represented by the first entry, the help note for the key combination "Ctrl"-"a" is a pointer (Bookmark) to a section on "Select All" within a help file. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computer implemented method for providing help information to a user of a computing system comprising the following steps performed by the computing system:

(a) detecting when a special key sequence remains selected for a predetermined length of time;

(b) when it is detected in step (a) that the special key sequence has remained selected for the predetermined length of time, performing the following substep:

(b.1) displaying information on shortcuts available for key combinations which include the special key sequence; and, (c) performing a first shortcut when it is detected that the special key sequence is selected and before expiration of the predetermined length of time another key has been selected simultaneous to the special key sequence remaining selected.

2. A computer implemented method as in claim 1 wherein step (b) additionally includes the following substep performed after the information on shortcuts is displayed:

(b.2) ceasing to display the information on shortcuts upon the user releasing the special key sequence.

3. A computer implemented method as in claim 1 wherein in step (a) the special key sequence is one of the following sequences selected on a keyboard:

a control key alone;
   an alternate key alone;
   a first plurality of keys which include the control key and the alternate key;
   a second plurality of keys which include the control key and a shift key;
   a third plurality of keys which include the alternate key and the shift key; and,
   a fourth plurality of keys which include the alternate key, the control key and the shift key.

4. A computer implemented method as in claim 1 wherein in step (a) the special key sequence is one of the following sequences selected on a keyboard and a pointing device:

a pointing device button alone;
   a control key and the pointing device button;
   an alternate key and the pointing device button;
   the control key, the alternate key and the pointing device button;
   the control key, a shift key and the pointing device button;
   the alternate key, the shift key and the pointing device button; and,
   the alternate key, the control key, the shift key and the pointing device button.

5. A computer implemented method as in claim 1 wherein substep (b.1) includes displaying entries in a window, and wherein step (b) additionally includes the following substeps performed when the special key sequence has remained selected for the predetermined length of time:

(b.2) detecting when the user places a cursor over an entry in the window; and, (b.3) when it is detected in substep (b.2) that the user has placed the cursor over an entry in the window, displaying a help note for the entry.

6. A computer implemented method as in claim 5 wherein in substep (b.3) the help note displayed contains information previously entered by a user.

7. A computer implemented method as in claim 5 wherein in substep (b.3) the help note displayed contains text from a help file which explains operation of a function which is called by the new key combination.

8. A computer implemented method as in claim 5 wherein substep (b.3) additionally includes the following substep performed after the help note is displayed for the new key combination:

(b.3.1) ceasing to display the help note upon the user moving the cursor away from the entry.

9. A computer implemented method as in claim 5 wherein substep (b.3) additionally includes the following substep performed after the help note is displayed for the new key combination:

(b.3.1) performing a function for the entry when the user clicks a button on a pointing device while the cursor remains placed over the entry.

10. A computer implemented method as in claim 1 wherein substep (b.1) includes displaying entries in a window, and wherein step (b) additionally includes the following substeps performed when the special key sequence has remained selected for the predetermined length of time:

(b.2) detecting when the user places a cursor over an entry in the window; and, (b.3) performing a function for the entry when the user clicks a button on a pointing device while the cursor remains placed over the entry.

11. A computer implemented method as in claim 1 wherein substep (b.1) includes displaying a button for a history stack, and wherein step (b) additionally includes the following substeps performed when the special key sequence has remained selected for the predetermined length of time:

(b.2) detecting when the user places a cursor over the button for the history stack; and, (b.3) when it is detected in substep (b.2) that the user has placed the cursor over the button for the history stack, displaying the history stack.

12. A computer implemented method as in claim 11 wherein substep (b.3) includes the following substeps:

(b.3.1) detecting when the user places the cursor over an entry within the history stack; and, (b.3.2) performing a function for the entry when the user clicks a button on a pointing device while the cursor remains placed over the entry.

13. A computer implemented method as in claim 11 wherein substep (b.3) includes the following substeps:

(b.3.1) detecting when the user places the cursor over an entry within the history stack; and, (b.3.2) when it is detected in substep (b.3.1) that the user has placed the cursor over the entry within the history stack, displaying a help note for the entry.

14. A computer implemented method as in claim 13 wherein substep (b.3.2) additionally includes the following substep:

(b.3.2.1) performing a function for the entry when the user clicks a button on a pointing device while the cursor remains placed over the entry.

15. A computer implemented method for providing help information to a user of a computing system comprising the following steps performed by the computing system:

(a) detecting when a special key sequence remains selected for a predetermined length of time;

(b) when it is detected in step (a) that the special key sequence has remained selected for the predetermined length of time, performing the following substeps:

(b.1) displaying information on shortcuts available for key combinations which include the special key sequence (b.2) detecting when the user presses an additional key in addition to the special key sequence remaining selected, the additional key plus the special key sequence forming a new key combination; and, (b.3) when it is detected in substep (b.2) that the user has pressed the additional key in addition to the special key sequence remaining selected, displaying a help note for the new key combination.

16. A computer implemented method as in claim 15 wherein in substep (b.3) the help note displayed contains information previously entered by a user.

17. A computer implemented method as in claim 15 wherein in substep (b.3) the help note displayed contains text from a help file which explains operation of a function which is called by the new key combination.

18. A computer implemented method as in claim 15 wherein substep (b.3) additionally includes the following substep performed after the help note is displayed for the new key combination:

(b.3.1) ceasing to display the help note upon the user releasing the additional key.

19. A computer implemented method as in claim 15 wherein substep (b.3) additionally includes the following substep performed after the user has released the additional key:

(b.3.1) detecting when the user presses a second additional key in addition to the special key sequence remaining selected, the second additional key plus the special key sequence forming a second new key combination; and, (b.3.2) when it is detected in substep (b.3.1) that the user has pressed the second additional key in addition to the special key sequence remaining selected, displaying a help note for the second new key combination.

20. A computer implemented method as in claim 19 wherein substep (b.3.2) additionally includes the following substep performed after the help note is displayed for the second new key combination:

(b.3.2.1) ceasing to display the help note upon the user releasing the second additional key.

21. A computing system comprising:

a keyboard, having a plurality of keys;

a pointing and selecting device, having a selection button;

detecting means for detecting when a special key sequence remains selected for a predetermined length of time, the special key sequence including the selection button or at least one key from the plurality of keys;

display means for displaying information on shortcuts available for key combinations which include the special key sequence, the display means displaying the information on shortcuts when the detecting means detects that the special key sequence has remained selected for the predetermined length of time; and, execution means for performing a first shortcut when it is detected that the special key sequence is selected and before expiration of the predetermined length of time another key has been selected simultaneous to the special key sequence remaining selected.

22. A computing system as in claim 21 wherein the help note displayed contains information previously entered by a user.

23. A computing system as in claim 21 wherein the help note displayed contains text from a help file which explains operation of a function which is called by the new key combination.

24. A computing system as in claim 23 wherein the display means is additionally for ceasing to display the help note upon the user releasing the second additional key.

25. A computing system as in claim 21 wherein the display means is additionally for ceasing to display the help note upon the user releasing the additional key.

26. A computing system as in claim 21:

wherein the detecting means is additionally for detecting when the user presses a second additional key while the special key sequence remains selected, the second additional key plus the special key sequence forming a second new key combination; and, wherein the display means is additionally for displaying a help note for the second new key combination when the detecting means detects that the user has pressed the second additional key while the special key sequence remains selected.

27. A computing system as in claim 21 wherein the display means is additionally for ceasing to display the information on shortcuts upon the user releasing the special key sequence.

28. A computing system as in claim 21 wherein the special key sequence is one of the following sequences selected on a keyboard:

a control key alone;

an alternate key alone;

a first plurality of keys which include the control key and the alternate key;

a second plurality of keys which include the control key and a shift key;

a third plurality of keys which include the alternate key and the shift key; and, a fourth plurality of keys which include the alternate key, the control key and the shift key.

29. A computing system comprising:

a keyboard, having a plurality of keys;

a pointing and selecting device, having a selection button;

detecting means for detecting when a special key sequence remains selected for a predetermined length of time, the special key sequence including the selection button or at least one key from the plurality of keys; and, display means for displaying information on shortcuts available for key combinations which include the special key sequence, the display means displaying the information on shortcuts when the detecting means detects that the special key sequence has remained selected for the predetermined length of time;

wherein the detecting means is additionally for detecting when the user presses an additional key in addition to the special key sequence remaining selected, the additional key plus the special key sequence forming a new key combination; and, wherein the display means is additionally for displaying a help note for the new key combination, when the detecting means detects that the user has pressed the additional key in addition to the special key sequence remaining selected.

30. A help system that provides information about shortcuts available from a keyboard comprising:

detecting means for detecting when a special key sequence on the keyboard remains selected for a predetermined length of time;

display means for displaying information on shortcuts available for key combinations which include the special key sequence, the display means displaying the information on shortcuts when the detecting means detects that the special key sequence has remained selected for a predetermined length of time; and, execution means for performing a first shortcut when it is detected that the special key sequence is selected and before expiration of the predetermined length of time another key has been selected simultaneous to the special key sequence remaining selected.

31. A help system that provides information about shortcuts available from a keyboard comprising:

detecting means for detecting when a special key sequence on the keyboard remains selected for a predetermined length of time:

display means for displaying information on shortcuts available for key combinations which include the special key sequence, the display means displaying the information on shortcuts when the detecting means detects that the special key sequence has remained selected for a predetermined length of time:

wherein the detecting means is additionally for detecting when the user presses an additional key in addition to the special key sequence remaining selected, the additional key plus the special key sequence forming a new key combination; and, wherein the display means is additionally for displaying a help note for the new key combination, when the detecting means detects that the user has pressed the additional key in addition to the special key sequence remaining selected.

* * * * *

UNITED STATES PATENT AND TRADEMARK OFFICE
CERTIFICATE OF CORRECTION

PATENT NO.   : 5,973,688
DATED        : October 22, 1999
INVENTOR(S)  : Gregory J. May It is certified that error appears in the above-identified patent and that said Letters Patent is hereby corrected as shown below:

Column 1,
Line 33, after "Corporation." begin a new paragraph

Column 9,
Line 63, after "and," begin a new paragraph

Column 12,
Lines 14 and 20, delete "time:" and insert therefor -- time; --

Signed and Sealed this

Twenty-eighth Day of September, 2004

JON W. DUDAS
*Director of the United States Patent and Trademark Office*